United States Patent
Yamabe et al.

(10) Patent No.: US 9,057,132 B2
(45) Date of Patent: Jun. 16, 2015

(54) PRIMER COMPOSITION

(71) Applicant: SUMITOMO METAL MINING CO., LTD., Tokyo (JP)

(72) Inventors: Hidetoshi Yamabe, Ichikawa (JP); Yuka Takita, Ichikawa (JP); Kyouko Miyauchi, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/361,485

(22) PCT Filed: Nov. 20, 2012

(86) PCT No.: PCT/JP2012/080110
§ 371 (c)(1),
(2) Date: May 29, 2014

(87) PCT Pub. No.: WO2013/080844
PCT Pub. Date: Jun. 6, 2013

(65) Prior Publication Data
US 2014/0343193 A1    Nov. 20, 2014

(30) Foreign Application Priority Data
Nov. 30, 2011  (JP) .................................. 2011-261248

(51) Int. Cl.
| | | |
|---|---|---|
| *C09D 163/02* | (2006.01) | |
| *C09D 163/04* | (2006.01) | |
| *C08K 3/36* | (2006.01) | |
| *C08K 9/00* | (2006.01) | |
| *C23C 22/02* | (2006.01) | |
| *C09D 5/00* | (2006.01) | |
| *C09D 7/12* | (2006.01) | |
| *C09D 163/00* | (2006.01) | |
| *C08G 59/38* | (2006.01) | |
| *C08G 59/40* | (2006.01) | |
| *B32B 15/092* | (2006.01) | |
| *B32B 27/20* | (2006.01) | |
| *B32B 27/26* | (2006.01) | |
| *B32B 27/38* | (2006.01) | |

(52) U.S. Cl.
CPC . *C23C 22/02* (2013.01); *C09D 5/00* (2013.01); *C09D 7/12* (2013.01); *C09D 163/04* (2013.01); *C09D 5/002* (2013.01); *C09D 7/1266* (2013.01); *C08G 59/38* (2013.01); *C08G 59/4021* (2013.01); *C09D 163/00* (2013.01); *C08K 2201/003* (2013.01)

(58) Field of Classification Search
None
See application file for complete search history.

(56) References Cited

U.S. PATENT DOCUMENTS 4,016,894 A * 4/1977 Baldwin et al. .................. 137/13
4,199,447 A * 4/1980 Chambers et al. ............ 210/638

FOREIGN PATENT DOCUMENTS

| | | |
|---|---|---|
| JP | 61-24179 B2 | 6/1986 |
| JP | 6-57872 B2 | 7/1987 |
| JP | 06-009311 A | 1/1994 |
| JP | 10-025462 A | 1/1998 |
| JP | 2003-049114 A | 2/2003 |
| JP | 2007-077358 A | 3/2007 |
| JP | 2009-220328 A | 10/2009 |
| WO | WO 8101857 A * 7/1981 .............. C08L 63/04 |
| WO | WO-2012/036091 A1 | 3/2012 |

OTHER PUBLICATIONS

H. Yamabe et al., "A Study of Surface Modification of Stainless Steels (III)", Journal of the Japan Society of Colour Material, vol. 70, No. 12, 1997, pp. 763-771, a cover page and table of contents.
H.-J. Tiller et al., "Silicoater-Verfahren", Fertigungssystem Kleben', 89, VCH Verlag, 1989, pp. 95-105 and cover pages.
International Search Report dated Feb. 19, 2013, issued for PCT/JP2012/080110.

* cited by examiner

*Primary Examiner* — Michael J Feely
(74) *Attorney, Agent, or Firm* — Locke Lord LLP; James E. Armstrong, IV; Nicholas J. DiCeglie, Jr.

(57) ABSTRACT

Disclosed herein is a primer composition capable of forming a primer layer excellent in adhesion properties and film-forming properties on the surfaces of various materials that may be bonded with an epoxy-based adhesive. The primer composition includes: an epoxy resin containing at least a bisphenol A-type epoxy resin and a phenol novolac-type epoxy resin; a curing agent being dicyandiamide; a curing catalyst being imidazole; and an inorganic oxide filler containing fumed silica, at least a surface of which is hydrophobic and which has a primary particle diameter of 7 to 40 nm and a specific surface area of 50 to 380 $m^2/g$, in an amount of 0.5 to 3 parts by weight per 100 parts by weight of the total amount of the epoxy resins, wherein the primer composition includes no solvent.

8 Claims, No Drawings

PRIMER COMPOSITION

TECHNICAL FIELD

The present invention relates to a primer composition, and more particularly relates to a novel primer composition capable of improving the affinity of surfaces of various materials for an adhesive to tightly bond the materials with the adhesive.

BACKGROUND ART

Various metal materials such as stainless steel, common steel, aluminum, aluminum alloys, copper, and galvanized steel are widely used in various fields, such as building materials and electronic devices, for their excellent corrosion resistance and external appearance. When these metal materials are used as structural members, various components, etc., it is often the case that metal material plates need to be joined together or to other components or members. In this case, metal material plates are conventionally often joined together by welding.

However, when metal materials are joined by welding, there is a problem that weld marks are left on the surfaces of welded metal material plates; therefore, excellent external appearance unique to metal material plates is impaired. Further, sheet-metal processing is required to remove weld marks or weld distortions. However, such sheet-metal processing is avoided by workers as well as peripheral people because a lot of time and effort is required and working conditions are worsened by noise generation etc.

For this reason, as a method for joining metal materials as an alternative to welding, a bonding method using an adhesive has received attention in recent years. The bonding method using an adhesive is advantageous in that external appearance of metal materials is hardly impaired; therefore, the above-described sheet-metal processing is not required. However, the surface of a metal material is generally often coated with a stable oxide film. Particularly, stainless steel is coated with an oxide film excellent in corrosion resistance but very low in affinity for an adhesive, and therefore has a problem of poor adhesion. Further, the bonding method has a problem that an adhesive interface is poor in water resistance; therefore, when an adhesive joint between metal materials is exposed to a high-temperature and high-humidity atmosphere, bond strength is significantly reduced in a short period of time.

The affinity of such a metal material for an adhesive, especially for an epoxy-based adhesive can be improved by previously subjecting the surface of the metal material to activation treatment using an acid. For example, a method is known in which the surface of a stainless steel plate is treated with a mixed aqueous solution of sulfuric acid and oxalic acid. Another method is also known in which an aluminum plate or an aluminum alloy plate is immersed in a phosphoric acid aqueous solution or a dichromic acid aqueous solution or electrically anodized while being immersed in such an aqueous solution. These treatment methods are known to develop excellent adhesiveness, and are therefore practically used in, for example, the process of assembling an airplane.

However, the above-described method for activating the surface of stainless steel by acid treatment has a problem that smut is generated on the surface of stainless steel. This smut can be removed by treating the surface of stainless steel with a mixed aqueous solution of dichromic acid and sulfuric acid. However, such desmutting treatment generates chromium-containing wastewater, and is therefore strictly limited from the viewpoint of environmental destruction.

As a bonding method not requiring such desmutting treatment, a method has recently been tried in which a primer is previously applied onto the surface of a stainless steel plate to form an organic thin film (primer layer) to improve adhesiveness. For example, Patent Literature 1 discloses a method in which a stainless steel plate is treated with an aqueous primer containing an acidic phosphoric acid ester and/or a salt thereof and water to improve the adhesiveness of the stainless steel plate.

Further, the use of a silane coupling agent is known as a technique for imparting adhesiveness to a stainless steel plate, a common steel plate, an aluminum plate, an aluminum alloy plate, or the like. For example, Patent Literature 2 discloses a method in which the surface of a common steel plate or stainless steel is treated with a silane-based coupling agent to improve its adhesiveness to a fluorine-based coating film.

Non-Patent Literature 1 states that the adhesiveness of a stainless steel plate, a common steel plate, an aluminum plate, an aluminum alloy plate, or the like is improved by treatment using a silane coupling agent having a functional group reactive with an epoxy-based adhesive. Further, Patent Literature 3 discloses a primer composition containing a multifunctional epoxy resin and a bisphenol A-type epoxy resin as main components and imidazole as a curing agent.

With the spread of the bonding method in recent years, there are more and more cases where adhesive joints are temperature and high-humidity environment. For example, in the case of immersion in boiling water, that is, exposure to the severest conditions, it is difficult for surface treatment using a silane coupling agent or the like to suppress a reduction in the adhesiveness of adhesive joints. Therefore, Non-Patent Literature 2 proposes silicoater treatment as treatment for imparting stable adhesiveness to adhesive joints of various metal materials even in boiling water.

CITATION LIST

Patent Literatures

Patent Literature 1: JR 06-009311 A
Patent Literature 2: JP 06-057872 B
Patent Literature 3: JP 2007-077358 A

Non Patent Literatures

Non-Patent Literature 1: Yamabe Hidetoshi et al., "A study of Surface Modification of Stainless Steels", Journal of the Japan Society of Colour Material, Vol. 70, No. 12, 1997, pp. 763 to 771
Non-Patent Literature 2: Tiller et al., "Silicoater-Verfahren", Fertigungssystem Kleben', 89, VCH Verlag, 1989, pp. 95 to 106

SUMMARY OF INVENTION

Technical Problem

It has been confirmed that the affinity of various metal material plates such as stainless steel plates, common steel plates, aluminum plates, aluminum alloy plates, copper plates, and galvanized steel plates for an epoxy-based adhesive is improved by the above-described surface treatment using an acidic phosphoric acid ester disclosed in Patent Literature 1 or the above-described surface treatment using a silane-based coupling agent disclosed in Patent Literature 2.

However, such surface treatment methods cannot achieve adhesiveness comparable to that achieved by the above-described conventional treatment method using a mixed aqueous solution of sulfuric acid and oxalic acid. Therefore, it cannot be said that a bonded structure obtained by bonding a stainless steel plate or the like has bond strength and durability high enough for practical use; therefore, the bonded structure cannot be stably used for a long period of time.

The primer composition disclosed in Patent Literature 3 is poor in film-forming properties due to the absence of a filler. Further, the primer composition is diluted with an organic solvent such as toluene or methyl ethyl ketone to secure coating workability. Therefore, it is necessary to take measures against air pollution caused by VOCs (Volatile Organic Compounds), which is disadvantageous in that many restrictions are imposed during production and use.

The silane coupling agent disclosed in Non-Patent Literature 1 has a monomer structure; therefore, it is difficult to uniformly apply its diluted solution onto a soiled metal surface in practice. More specifically, the silane coupling agent can be tightly attached to an unsoiled metal surface by the condensation reaction of, for example, an alkoxy group or its hydrolysate, that is, a silanol group, and a hydroxyl group of an oxide layer on the metal surface.

However, a metal surface is usually contaminated with organic or inorganic matter present in the atmosphere, and the organic or inorganic matter deposited on an oxide layer on the metal surface is already tightly attached. It is actually difficult to completely remove such a contamination layer. Therefore, at present, it is difficult to uniformly attach the silane coupling agent to a soiled metal surface in practice. Further, the silicoater treatment disclosed in Non-Patent Literature 2 is high-temperature flame treatment; therefore, its application is limited to, for example, small base materials.

In view of the above conventional problems, it is an object of the present invention to provide a primer composition capable of forming a primer layer excellent in adhesion properties and film-forming properties on the surfaces of various materials that may be bonded with an epoxy-based adhesive. Particularly, it is an object of the present invention to provide an environmentally-friendly primer composition capable of imparting bond strength and bond durability equal to or higher than those imparted by treatment using a mixed aqueous solution of acids or chemical treatment using a silane coupling agent, which is conventional treatment practically used for bonding various materials, and of having a low viscosity without using a solvent to achieve excellent coating workability.

Solution to Problem

In order to achieve the above-descried object, a primer composition according to the present invention includes the primer composition to be applied onto a surface of a material that may be bonded with an epoxy-based adhesive, including: an epoxy resin containing at least a bisphenol A-type epoxy resin and a phenol novolac-type epoxy resin; a curing agent being dicyandiamide; a curing catalyst being imidazole; and an inorganic oxide filler containing fumed silica, at least a surface of which is hydrophobic and which has a primary particle diameter of 7 to 40 nm and a specific surface area of 50 to 380 $m^2/g$, in an amount of 0.5 to 3 parts by weight per 100 parts by weight of a total amount of the epoxy resins, wherein the primer composition includes no solvent.

In the primer composition according to the present invention, the phenol novolac-type epoxy resin and the bisphenol A-type epoxy resin are blended in a ratio of 10:90 to 30:70 parts by weight.

Further, in the primer composition according to the present invention, an amount of the dicyandiamide to be blended as the curing agent is 3 to 25 parts by weight per 100 parts by weight of a total amount of the epoxy resins.

Further, in the primer composition according to the present invention, the material that may be bonded with an epoxy-based adhesive is any one selected from the group consisting of a stainless steel material, a common steel material, an aluminum material, an aluminum alloy material, a copper material, and a galvanized steel material.

Further, in the primer composition according to the present invention, cured product of the primer composition has a glass transition temperature of at least 100° C.

Advantageous Effects of Invention

According to the present invention, it is possible to form a primer layer excellent in adhesion properties and film-forming properties on the surfaces of various materials to improve the affinity of the various materials for an epoxy-based adhesive. This makes it possible to, when a material with a primer layer is bonded with an epoxy-based adhesive, achieve high bond strength equal or superior to that achieved by treatment using a mixed aqueous solution of acids or chemical treatment using a silane coupling agent.

Further, the primer composition according to the present invention is an environmentally-friendly material because a low viscosity suitable for coating work can be achieved without using a solvent; therefore, environmental loads caused by coating work are low and there is no fear of air pollution caused by VOCs.

DESCRIPTION OF EMBODIMENTS

A primer composition according to the present invention includes, as essential components, an epoxy resin, a curing agent, a curing catalyst, and an inorganic oxide filler. The primer composition is applied onto, for example, the surface of a member made of a metal material, such as a metal plate, to form a primer layer to improve the affinity of the metal material for an epoxy-based adhesive. Therefore, various metal materials such as stainless steel, common steel, aluminum, aluminum alloys, copper, and galvanized steel can be easily and tightly bonded with an epoxy-based adhesive by forming a primer layer of the primer composition according to the present invention thereon.

A metal material to which the primer composition according to the present invention is mainly applied is not limited by its type or form, and the primer composition according to the present invention can be appropriately applied to plates, members of other forms, and metal components made of various metal material such as stainless steel, common steel, aluminum, aluminum alloys, copper, and galvanized steel. In the case of steel plates, the primer composition according to the present invention can be applied to, for example, common steel plates such as cold rolling steel plates and hoc rolling steel plates and various stainless steel plates such as martensitic stainless steel plates, ferritic stainless steel plates, and austenitic stainless steel plates.

An epoxy-based adhesive to be to bond various materials having a primer layer formed using the primer composition according to the present invention may be of one-component type or two-component type. Among then, a two-component type epoxy-based adhesive is preferably used because high bond strength can be achieved in industrial applications.

The primer composition according to the present invention mainly contains an epoxy resin. As the epoxy resin, a bifunctional bisphenol. A-type epoxy resin and a multifunctional (hereinafter, multifunctional refers to tri- or higher-functional) phenol novolac-type epoxy resin are used in combination. The bifunctional bisphenol A-type epoxy resin has strong adhesiveness to a metal surface due to the hydrogen bond properties of its hydroxyl group with the metal surface or flexibility given by intramolecular ether bond rotation. By blending this bisphenol A-type epoxy resin with the multifunctional phenol novolac-type epoxy resin, it is possible to increase the crosslink density of a cured product, thereby improving heat resistance or mechanical strength. Particularly, it is particularly important for the cured product to have a high crosslink density under severe use conditions, for example, immersion in boiling water.

The multifunctional phenol novolac-type epoxy resin for use in the primer composition according to the present invention is preferably a mixture of two or more kinds of multifunctional phenol novolac-type epoxy resins to achieve a coating viscosity within a practically applicable range.

The bisphenol A-type epoxy resin and the phenol novolac-type epoxy resin, which are used in combination as the epoxy resin contained in the primer composition according to the present invention, are preferably blended in a ratio of phenol novolac-type epoxy resin bisphenol A-type epoxy resin resin=10:90 to 30:70 parts by weight.

The reason for this is that if the amount of the phenol novolac-type epoxy resin to be blended is less than 10 parts by weight per 100 parts by weight of the total, amount of the epoxy resins, it is difficult to secure the boiling water resistant adhesiveness of a primer. On the other hand, if the amount of the phenol novolac-type epoxy resin to be blended is larger than 30 parts by weight per 100 parts by weight of the total amount of the epoxy resins, the degree of cross-linking is increased so that a primer becomes fragile, and in addition, it is difficult to achieve adequate adhesiveness due to the generation of a large stress between the primer and a metal material.

As a curing agent for the epoxy resin, dicyandiamide is used. Dicyandiamide is solid at ordinary temperature and hardly reacts with the epoxy resin. However, dicyandiamide is liquefied at a temperature higher than its melting point and reacts with a glycidyl group of the epoxy resin to cross-link and cure the epoxy resin. The primer composition according to the present invention uses dicyandiamide having such properties as a curing agent, and is therefore provided as a one-component type primer composition excellent in storage stability at ordinary temperature by previously blending dicyandiamide with the epoxy resin.

The amount of the dicyandiamide to be blended as a curing agent is preferably 3 to 25 parts by weight per 100 parts by weight of the total amount of the epoxy resins. If the amount of the dicyandiamide to be blended is less than 3 parts by weight, the curing of the primer composition is insufficient; therefore, it is difficult to achieve satisfactory boiling water resistant adhesiveness. On the other hand, if the amount of the dicyandiamide to be blended is larger than 25 parts by weight, the curing agent is excessive; therefore, the primer composition undesirably becomes rigid and fragile.

The primer composition according to the present invention uses imidazole as a curing catalyst. The selection of a curing catalyst is important because it influences the curing performance of the above-described dicyandiamide as a curing agent and the properties of a cured product. Imidazole is often used as a curing agent for a common epoxy resin, but in the present invention, imidazole is used in combination with the dicyandiamide used as a curing agent. This makes it possible to reduce the curing temperature of the epoxy resin to a manageable temperature of 180° C. or less and to obtain the effect of improving the heat resistance of a cured coating. Particularly, the glass transition temperature of the cured coating needs to be at least 100° C. to allow an adhesive joint to maintain high boiling water resistant adhesiveness. For this purpose, the combined use of the dicyandiamide as a curing agent and the imidazole as a curing catalyst is important.

The amount of the imidazole to be blended as a curing catalyst is preferably 0.5 to 2.0 parts by weight per 100 parts by weight of the total amount of the epoxy resins. The amount of the imidazole to be blended is less than 0.5 part by weight, a phenomenon in which curing does not occur is likely to occur. On the other hand, if the imidazole is added in an amount exceeding 2.0 parts by weight, curing proceeds during storage of the primer composition, which undesirably tends to cause gelation.

Preferred examples of the imidazole usable as a curing catalyst include 2-methylimidazole, 2-undecylimidazole, 2-heptadecylimidazol, 1,2-dimethylimidazole, 2-ethyl-4-methylimidazole, 2-phenylimidazole, 1-cyanoethyl-2-methylimidazole, 1-cyanoethyl-2-undecylimidazole, 1-cyanoethyl-2-phenylimidazole, 1-cyanoethyl-2-undecylimidazolium trimellitate, 2,4-diamino-6-(2'-methylimidazol-(1'))-ethyl-s-triazine, and 2,4-diamino-6-(2'-undecylimidazolyl-(1'))-ethyl-s-triazine. Among them, 2-methylimidazole is particularly preferred.

Further, the primer composition according to the present invention contains an inorganic oxide filler to obtain excellent coating properties and film-forming properties on a metal material surface and to secure excellent adhesiveness of a cured coating to a metal material surface in a severe environment.

More specifically, when the primer composition is cured by baking, a resin viscosity is temporarily reduced until thermal curing is started. At this time, the surface free energy of a soiled metal material surface is low; therefore, the surface free energy of the epoxy resin becomes higher, and as a result, there is a fear that a primer coating is repelled from the soiled metal material surface and loses its continuity. In order to prevent such a problem called "cissing", an inorganic oxide filler is blended. This makes it possible to control rheology, appropriately suppress a reduction in viscosity in a high-temperature atmosphere, and maintain the continuity of a primer coating.

As such an inorganic oxide filler, fumed silica is used in the present invention. Titanium oxide generally added to and blended into a primer composition has a drawback that it has a strong tendency to agglomerate, which increases the viscosity of the primer composition and makes it difficult to apply the primer composition during coating work. Therefore, it is important that the primer composition according to the present invention uses, instead of titanium oxide, fumed silica having a very small particle diameter as an inorganic oxide filler. When fumed silica is used, the viscosity of the primer composition is kept low during coating but is increased after coating, which makes it possible to impart thixotropy sufficient to suppress the occurrence of the above-described problem "cissing".

It is particularly important that fumed silica used in the present invention is one, at least a surface of which is hydrophobic and which has a primary particle diameter of 7 to 40 nm and a specific surface area of 50 to 380 $m^2/g$. This is because, when having a hydrophobic surface and a very small particle diameter, fumed silica is likely to agglomerate due to the generation of a repulsive force between the epoxy resin having high polarity and the fumed silica, which makes it easy to form a network structure that is a factor for the development of thixotropy.

The inorganic oxide filler needs to be blended so that the amount of the fumed silica to be blended is 0.5 to 3 parts by weight per 100 parts by weight of the total amount of the epoxy resins. If the amount of the fumed silica to be blended is less than 0.5 part by weight, a sufficient effect cannot be obtained. On the other hand, if the amount of the fumed silica to be blended exceeds 3 parts by weight, the viscosity of the primer composition becomes too high; therefore, it is difficult to apply the primer composition.

It is to be noted that, as described above, Patent Literature 3 discloses a known primer composition mainly containing a bisphenol A-type epoxy resin and a multifunctional epoxy resin. The coating workability of this primer composition is secured by solvent dilution. Therefore, for example, when toluene is used as a solvent, handling is complicated because it is necessary to take measures against air pollution. On the other hand, the viscosity of the primer composition according to the present invention can be controlled to be suitable for coating work using a bar coater or the like by blending only the above-described components without using an organic solvent such as toluene. More specifically, the viscosity of the primer composition according to the present invention can be controlled to be about 3 to 7 Pa·s.

As described above, the use of the primer composition according to the present invention makes it possible to obtain a structural member, such as a building material, excellent in strength by simply bonding metal materials with an adhesive. In addition, the thus obtained adhesive joint has excellent moisture resistance at high temperature, and therefore can maintain high bond strength for a long period of time even when exposed to a high-temperature and high-humidity environment, for example, immersion in boiling water.

Further, when the primer composition according to the present invention is used for bonding of an electric insulation material, an adhesive join can maintain stable adhesiveness even under severe use conditions, for example, immersion in a high-temperature strongly acidic or alkaline aqueous solution, which brings a new dimension to various electrochemical processes. That is, the primer composition according to the present invention is excellent in adhesion stability and can form a coating film having a very high crosslink density, and is therefore very useful also as an insulating film for metals for use in a strongly acidic or basic aqueous solution.

EXAMPLES

Example 1

Epoxy resins, a curing agent, a curing catalyst, and an inorganic oxide filler were weighed and mixed using EXCEL AUTO HOMOGENIZER manufactured by NIHONSEIKI KAISA LTD. under conditions of a rotation speed of 10000 rpm and a mixing time of 2 minutes to prepare primer compositions of Samples 1 to 16. The amounts of the components blended to prepare each of the primer compositions of Samples 1 to 16 are shown in the following Table 1.

TABLE 1

| | Epoxy resins (parts by weight) | | | | | Others (parts by weight/100 parts by weight of epoxy resins) | | | | | |
|---|---|---|---|---|---|---|---|---|---|---|---|
| Samples | Epoxy resin A | Epoxy resin B | Epoxy resin C | Curing agent | Catalyst | Fumed silica powder A1 | Fumed silica powder A2 | Fumed silica powder A3 | Fumed silica powder B | Silica powder | Titanium oxide |
| 1 | 70 | 15 | 15 | 5 | 1 | 1.5 | 0 | 0 | 0 | 0 | 0 |
| 2 | 80 | 10 | 10 | 5 | 1 | 1.5 | 0 | 0 | 0 | 0 | 0 |
| 3 | 90 | 5 | 5 | 5 | 1 | 1.5 | 0 | 0 | 0 | 0 | 0 |
| 4 | 80 | 10 | 10 | 5 | 1 | 0.5 | 0 | 0 | 0 | 0 | 0 |
| 5 | 80 | 10 | 10 | 5 | 1 | 1 | 0 | 0 | 0 | 0 | 0 |
| 6 | 80 | 10 | 10 | 5 | 1 | 3 | 0 | 0 | 0 | 0 | 0 |
| 7 | 80 | 10 | 10 | 3 | 1 | 1.5 | 0 | 0 | 0 | 0 | 0 |
| 8 | 80 | 10 | 10 | 25 | 1 | 1.5 | 0 | 0 | 0 | 0 | 0 |
| 9 | 80 | 10 | 10 | 5 | 1 | 0.5 | 0 | 0 | 0 | 55 | 12 |
| 10 | 80 | 10 | 10 | 5 | 1 | 0 | 0.5 | 0 | 0 | 0 | 0 |
| 11 | 80 | 10 | 10 | 5 | 1 | 0 | 0 | 0.5 | 0 | 0 | 0 |
| 12 | 80 | 10 | 10 | 5 | 0 | 4 | 0 | 0 | 0 | 0 | 0 |
| 13 | 80 | 10 | 10 | 5 | 1 | 0 | 0 | 0 | 0 | 0 | 30 |
| 14 | 80 | 10 | 10 | 5 | 1 | 0 | 0 | 0 | 0 | 50 | 0 |
| 15 | 80 | 10 | 10 | 5 | 1 | 0.4 | 0 | 0 | 0 | 0 | 0 |
| 16 | 80 | 10 | 10 | 5 | 1 | 0 | 0 | 0 | 0.5 | 0 | 0 |

(Notes)
Samples 12 to 16 are Comparative Examples.

As the epoxy resins, a bisphenol A-type epoxy resin JER828 (shown as "Epoxy resin A") manufactured by Mitsubishi Chemical Corporation, a phenol novolac epoxy resin JER152 (shown as "Epoxy resin B") manufactured by Mitsubishi Chemical Corporation, and a phenol novolac epoxy resin JER154 (shown as "Epoxy resin C") manufactured by Mitsubishi Chemical Corporation were used. The phenol novolac epoxy resins JER152 and JER154 were used as a mixture.

As the curing agent, a dicyandiamide curing agent (DICY7) manufactured by Mitsubishi Chemical Corporation was used. As the curing catalyst, 2-methyl imidazole manufactured by SHIKOKU CHEMICALS CORPORATION was used. As the inorganic oxide filler, hydrophobic fumed silica RY200S (shown as "Fumed silica powder A1"), RY50 (shown as "Fumed silica powder A2"), or RY300 (shown as "Fumed silica powder A3") manufactured by Nippon Aerosil Co., Ltd. was used. For the purpose of comparison, hydrophilic fumed silica 130 (shown as "Fumed silica powder B") manufactured by Nippon Aerosil Co., Ltd. was used.

It is to be noted that the fumed silica RY200S (Fumed silica powder A1) has a primary particle diameter of 16 nm and a specific surface area of 130 m²/g, the fumed silica RY50 (Fumed silica powder A2) has a primary particle diameter of 40 nm and a specific surface area of 50 m/g, the fumed silica RY300 (Fumed silica powder A3) has a primary particle diameter of 7 nm and a specific surface area of 300 m²/g, and the fumed silica 130 (Fumed silica powder B) has a primary particle diameter of 16 nm and a specific surface area of 130 m²/g. For the purpose of comparison, Sample 13 used, instead of the fumed silica, silica (HS-05) manufactured by KINSEI MATEC CO., LTD. and having an average particle diameter of 3 to 24 pin, and Sample 14 used, instead of the fumed silica, titanium oxide (TIPAQUE: CR60) manufactured by ISHIHARA SANGYO KAISHA, LTD. and having an average particle diameter of 0.21 μm. Sample 9 used the above-described silica and titanium oxide in addition to the fumed silica.

The obtained primer compositions of Samples 1 to 16 were evaluated for film-forming properties during coating. In addition, two stainless steel plates each having a primer layer of each of Samples 1 to 16 were bonded together with a two-component type epoxy-based adhesive to evaluate bond performance. More specifically, a plurality of test pieces each having a width of 25 mm and a length of 100 mm were cut out from a 1.2 mm-thick SUS304 stainless steel plate (2B finish), and then these test pieces were immersed in acetone at room temperature for 3 minutes for degreasing. Then, the primer compositions of Samples 1 to 16 were applied onto the test pieces, respectively, by a bar coater to have a thickness of 60 μm and cured by heating at 175° C. for 45 minutes to form primer layers. The thus obtained primer layers were visually observed to evaluate film-forming properties.

Then, two test pieces were prepared for each of the primer compositions of Samples 1 to 16, and a primer layer was formed on each test piece in the same manner as described above. These two test pieces were opposed to each other so that their primer layers faced each other, and were immediately bonded together with a two-component type epoxy-based adhesive (DP-190 Gray manufactured by Sumitomo 3M Limited) so that a lap width was 12.5 mm. Further, for the purpose of comparison with a case where no primer layer was formed, two test pieces having no primer were prepared as Sample 17, and these test pieces were bonded together in the same manner as described above.

Then, an adhesive joint between the bonded test pieces of each of Samples 1 to 17 was cured at room temperature for 24 hours and was further maintained at 100° C. for 1 hour to be completely cured. Thien, the bonded test pieces were subjected to measurement of initial shear bond strength in accordance with JIS K6850. Further, in order to examine the moisture resistance performance of the adhesive joint, the bonded test pieces were immersed in boiling water for 7 days and then subjected to measurement of shear bond strength in the same manner as described above.

The obtained measurement results of initial shear bond strength and shear bond strength after immersion in boiling water are shown in the following Table 2 together with the evaluation results of film-forming properties of the primer compositions. It is to be noted that the film-forming properties were evaluated according to the following criteria:

good: a film of the primer composition was uniformly formed on the entire surface of the test place;

average: a film of the primer composition was formed but one-half or more of the surface of the test piece was not coated with the film; and poor: a film of the primer composition was not formed at all and droplets of the primer composition were formed. Further, the viscosity of each of the primer compositions of Samples 1 to 16 was measured using a B-type viscometer at 40° C. at 5 rpm, and the measurement results are also shown in Table 2.

TABLE 2

| Samples | Film-forming properties | Viscosity (Pa · s) | Shear strength (MPa) | |
|---|---|---|---|---|
| | | | Initial | After immersion in boiling water |
| 1 | good | 5 | 20 | 16 |
| 2 | good | 4.5 | 22 | 17 |
| 3 | good | 4.1 | 23 | 15 |
| 4 | good | 3.5 | 22 | 17 |
| 5 | good | 3.8 | 24 | 18 |
| 6 | good | 6 | 22 | 16 |
| 7 | good | 4.1 | 20 | 14 |
| 8 | good | 6 | 22 | 15 |
| 9 | good | 6 | 25 | 19 |
| 10 | good | 3.4 | 24 | 18 |
| 11 | good | 4 | 24 | 19 |
| 12 | Not coatable | 10 | — | — |
| 13 | average | 6.1 | 15 | 10 |
| 14 | poor | 5.2 | Not measurable | Not measurable |
| 15 | poor | 3 | Not measurable | Not measurable |
| 16 | poor | 5 | Not measurable | Not measurable |
| 17 | — | — | 20 | 2 |

(Note)
Samples 12 to 17 are Comparative Examples.

As can be seen from the above Table 2, each of the primer compositions of Samples 1 to 11 according to the present invention had excellent film-forming properties, and the adhesive joint between the test pieces of each of Samples 1 to 11 bonded together with the epoxy-based adhesive had high bond strength, and further had excellent water resistance and therefore could maintain high bond strength. Further, as can be seen from the results of Sample 9, even when silica powder and titanium oxide were added to fumed silica, the viscosity of the primer composition could be controlled to be low and excellent film-forming properties were achieved.

On the other hand, Samples 12 to 17 as Comparative Examples were poor in either film-forming properties or bond strength. Particularly, in the cases of Samples 12, 14, 15, and 16, a film of the primer composition was not formed; therefore, film adhesiveness could not be evaluated. Sample 17 had high initial shear bond strength, but the shear bond strength of Sample 17 was significantly reduced after immersion in boiling water. As can be seen from these results, the viscosity during coating was reduced and satisfactory film-forming properties and high adhesiveness were maintained by properly blending the bisphenol A-type epoxy resin and the multi functional phenol novolac epoxy resin and adding the hydrophobic fumed silica to a system containing the dicyandiamide curing agent and the imidazole-based catalyst.

Example 2

The primer compositions of Samples 1 to 16 shown in the above Table 1 were evaluated for film-forming properties during coating in the same manner as in Example 1 except that the test pieces were cut out from another metal material instead of the stainless steel plate. Further, two test pieces each having a primer layer of each of the primer compositions of Samples 1 to 16 were prepared in the same manner as in Example 1 except that the test pieces were cut out from another metal material instead of the stainless steel plate, and were bonded with an epoxy-based adhesive to evaluate bond performance in the same manner as in Example 1. Further, two test pieces having no primer layer were prepared as Sample 17 in the same manner as in Example 1 except that the test pieces were cut out from another metal material instead of the stainless steel plate, and were bonded together with an epoxy-based adhesive to evaluate bond performance in the same manner as in Example 1. The results are shown in the following Table 3 (i.e., a case where the test pieces were cut out from a galvanized steel plate), Table 4 (i.e., a case where the test pieces were cut out from a copper plate), Table 5 (i.e., a case where the test pieces were cut out from an aluminum plate), and Table 6 (i.e., a case where the test pieces were cut out from a common steel plate)

TABLE 3

| Samples | Film-forming properties | Shear strength (MPa) Initial | Shear strength (MPa) After immersion in boiling water |
|---|---|---|---|
| 1 | good | 12 | 10 |
| 2 | good | 13 | 11 |
| 3 | good | 13 | 11 |
| 4 | good | 12 | 12 |
| 5 | good | 15 | 12 |
| 6 | good | 11 | 10 |
| 7 | good | 11 | 9 |
| 8 | good | 12 | 10 |
| 9 | good | 14 | 12 |
| 10 | good | 14 | 12 |
| 11 | good | 13 | 11 |
| 12 | Not coatable | — | — |
| 13 | average | 10 | 7 |
| 14 | poor | Not measurable | Not measurable |
| 15 | poor | Not measurable | Not measurable |
| 16 | poor | Not measurable | Not measurable |
| 17 | — | 13 | 4 |

(Note)
Samples 12 to 17 are Comparative Examples.

TABLE 4

| Samples | Film-forming properties | Shear strength (MPa) Initial | Shear strength (MPa) After immersion in boiling water |
|---|---|---|---|
| 1 | good | 15 | 12 |
| 2 | good | 16 | 13 |
| 3 | good | 16 | 12 |
| 4 | good | 15 | 13 |
| 5 | good | 18 | 14 |
| 6 | good | 15 | 12 |
| 7 | good | 14 | 11 |
| 8 | good | 15 | 12 |
| 9 | good | 18 | 16 |
| 10 | good | 17 | 15 |
| 11 | good | 17 | 16 |
| 12 | Not coatable | — | — |
| 13 | average | 12 | 7 |
| 14 | poor | Not measurable | Not measurable |
| 15 | poor | Not measurable | Not measurable |
| 16 | poor | Not measurable | Not measurable |
| 17 | — | 15 | 1 |

(Note)
Samples 12 to 17 are Comparative Examples.

TABLE 5

| Samples | Film-forming properties | Shear strength (MPa) Initial | Shear strength (MPa) After immersion in boiling water |
|---|---|---|---|
| 1 | good | 12 | 10 |
| 2 | good | 11 | 10 |
| 3 | good | 11 | 9 |
| 4 | good | 12 | 11 |
| 5 | good | 14 | 11 |
| 6 | good | 11 | 9 |
| 7 | good | 11 | 9 |
| 8 | good | 11 | 8 |
| 9 | good | 12 | 9 |
| 10 | good | 12 | 9 |
| 11 | good | 12 | 8 |
| 12 | Not coatable | — | — |
| 13 | average | 10 | 5 |
| 14 | poor | Not measurable | Not measurable |
| 15 | poor | Not measurable | Not measurable |
| 16 | poor | Not measurable | Not measurable |
| 17 | — | 12 | 3 |

(Note)
Samples 12 to 17 are Comparative Examples.

TABLE 6

| Samples | Film-forming properties | Shear strength (MPa) Initial | Shear strength (MPa) After immersion in boiling water |
|---|---|---|---|
| 1 | good | 25 | 22 |
| 2 | good | 26 | 23 |
| 3 | good | 26 | 22 |
| 4 | good | 25 | 23 |
| 5 | good | 28 | 24 |
| 6 | good | 25 | 22 |
| 7 | good | 24 | 21 |
| 8 | good | 25 | 22 |
| 9 | good | 28 | 26 |
| 10 | good | 27 | 25 |
| 11 | good | 27 | 26 |
| 12 | Not coatable | — | — |
| 13 | average | 22 | 15 |
| 14 | poor | Not measurable | Not measurable |
| 15 | poor | Not measurable | Not measurable |
| 16 | poor | Not measurable | Not measurable |
| 17 | — | 25 | 10 |

(Note)
Samples 12 to 17 are Comparative Examples.

As can be seen from the results shown in Tables 3 to 6, also when the test pieces were cut out from a common steel plate, an aluminum plate, a copper plate, and a galvanized steel place, satisfactory film-forming properties and high adhesiveness were maintained by using the primer composition according to the present invention as in the case where the test pieces were cut out from a stainless steel plate.

The invention claimed is:
1. A primer composition to be applied onto a surface of a material that may be bonded with an epoxy-based adhesive, comprising:
an epoxy resin containing at least a bisphenol A-type epoxy resin and a mixture of two or more kinds of multifunctional phenol novolac-type epoxy resins;
a curing agent being dicyandiamide;
a curing catalyst being imidazole; and
an inorganic oxide filler containing fumed silica, at least a surface of which is hydrophobic and which has a primary particle diameter of 7 to 40 nm and a specific surface area of 50 to 380 m²/g, in an amount of 0.5 to 3 parts by weight per 100 parts by weight of a total amount of the epoxy resins,
wherein the primer composition is a one-component type composition having viscosity of 3 to 7 Pa·s and includes no solvent.

2. The primer composition according to claim 1, wherein the phenol novolac-type epoxy resins and the bisphenol A-type epoxy resin are blended in a ratio of 10:90 to 30:70 parts by weight.

3. The primer composition according to claim 1, wherein an amount of the dicyandiamide to be blended as the curing agent is 3 to 25 parts by weight per 100 parts by weight of a total amount of the epoxy resins.

4. The primer composition according to claim 1, wherein the material is any one selected from the group consisting of a stainless steel material, a common steel material, an aluminum material, an aluminum alloy material, a copper material, and a galvanized steel material.

5. The primer composition according to claim 1, whose cured product has a glass transition temperature of at least 100° C.

6. The primer composition according to claim 2, whose cured product has a glass transition temperature of at least 100° C.

7. The primer composition according to claim 3, whose cured product has a glass transition temperature of at least 100° C.

8. The primer composition according to claim 4, whose cured product has a glass transition temperature of at least 100° C.

* * * * *